United States Patent
Morita

(10) Patent No.: US 9,788,287 B2
(45) Date of Patent: Oct. 10, 2017

(54) MOBILE COMMUNICATION SYSTEM, BASE STATION, USER TERMINAL AND PROCESSOR

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 64 days.

(21) Appl. No.: 14/767,088

(22) PCT Filed: Feb. 18, 2014

(86) PCT No.: PCT/JP2014/053740
§ 371 (c)(1),
(2) Date: Aug. 11, 2015

(87) PCT Pub. No.: WO2014/129450
PCT Pub. Date: Aug. 28, 2014

(65) Prior Publication Data
US 2016/0007304 A1 Jan. 7, 2016

Related U.S. Application Data

(60) Provisional application No. 61/766,488, filed on Feb. 19, 2013.

(51) Int. Cl.
*H04W 52/38* (2009.01)
*H04W 52/36* (2009.01)
(Continued)

(52) U.S. Cl.
CPC ......... *H04W 52/383* (2013.01); *H04W 8/005* (2013.01); *H04W 52/0209* (2013.01);
(Continued)

(58) Field of Classification Search
None
See application file for complete search history.

(56) References Cited

U.S. PATENT DOCUMENTS

2004/0203435 A1* 10/2004 Karlquist ............ H04W 8/005
455/67.11
2005/0079819 A1* 4/2005 Tsutsui ............... H04W 8/005
455/41.2
(Continued)

OTHER PUBLICATIONS

3rd Generation Partnership Project; Technical Specification Group Services and System Aspects; Feasibility Studay for Proximity Services (ProSe) (Release 12); 2012; pp. 1-40.
(Continued)

*Primary Examiner* — Andrew Lai
*Assistant Examiner* — Jamaal Henson
(74) *Attorney, Agent, or Firm* — Studebaker & Brackett PC

(57) ABSTRACT

A mobile communication system according to the present invention supports D2D communication that is direct device-to-device communication in which a data path does not pass through a core network, The mobile communication system has a user terminal that exists on a cell managed by a base station and a plurality of user terminals that include the user terminal and perform a process of discovering a partner terminal in the D2D communication or the D2D communication, in which a maximum value of transmission power used by the user terminal for the discovering process or the D2D communication is calculated so that the maximum value becomes larger according to the number of the plurality of user terminals, and the user terminal performs the discovering process or the D2D communication so that the transmission power does not exceed the maximum value.

8 Claims, 13 Drawing Sheets

(51) Int. Cl.
*H04W 8/00* (2009.01)
*H04W 52/02* (2009.01)
*H04W 72/08* (2009.01)
*H04W 88/02* (2009.01)
*H04W 88/08* (2009.01)

(52) U.S. Cl.
CPC ....... *H04W 52/367* (2013.01); *H04W 72/085* (2013.01); *H04W 88/02* (2013.01); *H04W 88/08* (2013.01); *Y02B 60/50* (2013.01)

(56) References Cited

U.S. PATENT DOCUMENTS

| | | | | |
|---|---|---|---|---|
| 2006/0253488 | A1* | 11/2006 | Akaiwa | H04M 1/7253 |
| 2007/0133483 | A1* | 6/2007 | Lee | H04W 52/32 |
| | | | | 370/338 |
| 2009/0011770 | A1* | 1/2009 | Jung | H04L 5/0037 |
| | | | | 455/452.1 |
| 2011/0051697 | A1* | 3/2011 | Wang | H04W 52/343 |
| | | | | 370/336 |
| 2011/0188486 | A1* | 8/2011 | Kim | H04W 52/243 |
| | | | | 370/338 |
| 2013/0157676 | A1* | 6/2013 | Baek | H04W 72/0486 |
| | | | | 455/452.1 |
| 2013/0281149 | A1* | 10/2013 | Brunel | H04W 52/146 |
| | | | | 455/522 |
| 2014/0086157 | A1* | 3/2014 | Bontu | H04W 52/383 |
| | | | | 370/329 |

OTHER PUBLICATIONS

International Search Report for PCT/JP2014/053740 dated May 13, 2014.

* cited by examiner

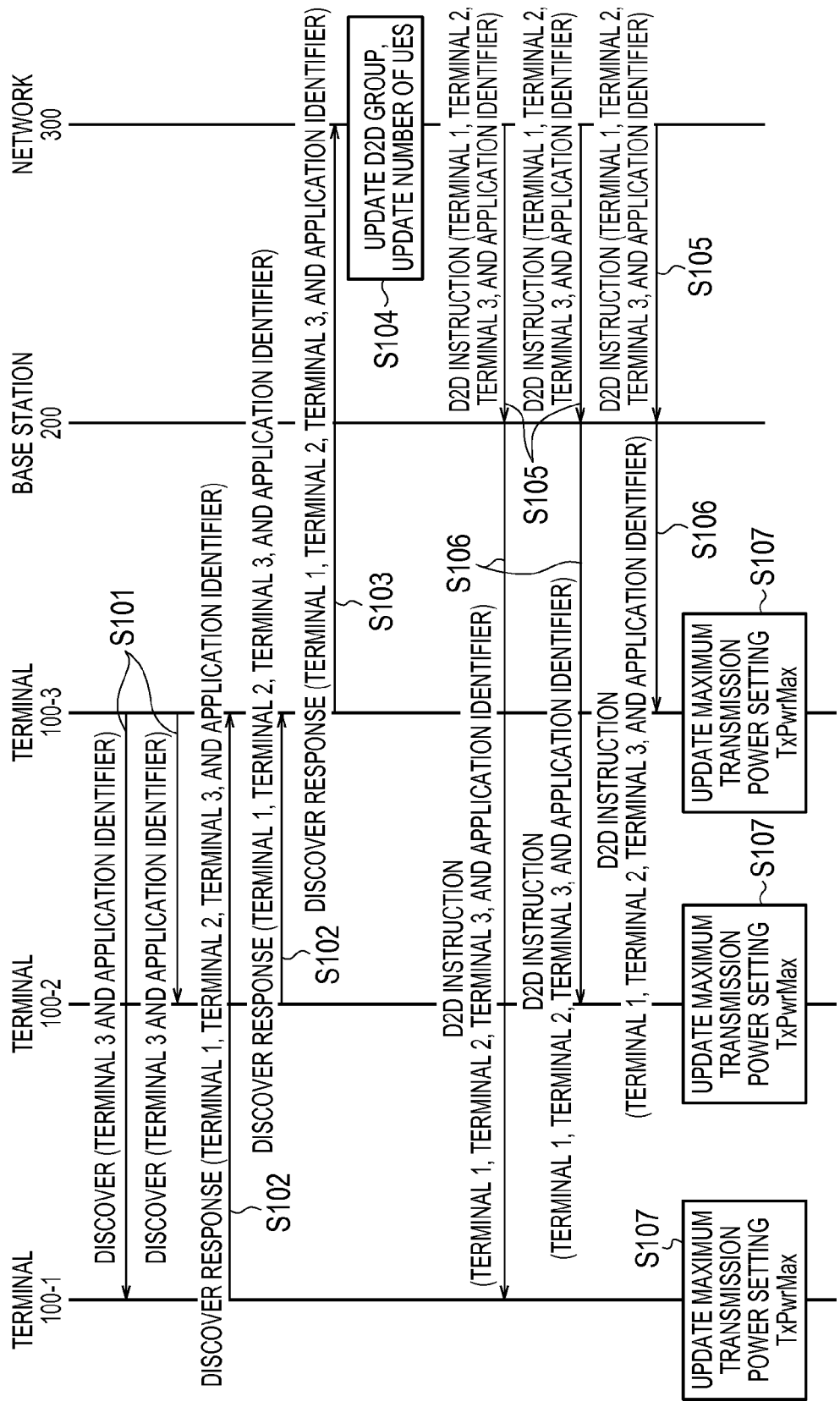

MOBILE COMMUNICATION SYSTEM, BASE STATION, USER TERMINAL AND PROCESSOR

TECHNICAL FIELD

The present invention relates to a mobile communication system that supports D2D communication, a base station, a user terminal, and a processor.

BACKGROUND ART

In 3GPP (3rd Generation Partnership Project) which is a project aiming to standardize a mobile communication system, the introduction of Device to Device (D2D) communication is discussed as a new function after Release (see Non Patent Document 1).

In the D2D communication, a plurality of neighboring user terminals (a user terminal group) perform direct communication without passing through a core network. That is, a data path of the D2D communication does not pass through the core network. On the other hand, a data path of normal communication (cellular communication) of a mobile communication system passes through the core network.

Further, in order to perform the D2D communication, a user terminal performs a process of discovering a partner terminal (proximal terminal) in the D2D communication. The user terminal transmits a discovery-use signal for discovering the partner terminal (or for being discovered by the partner terminal) so as to discover the partner terminal. The user terminal having discovered the partner terminal starts the D2D communication with the partner terminal.

PRIOR ART DOCUMENT

Non-Patent Document

[Non Patent Document 1] 3GPP technical report "TR 22.803 V12.0.0" December 2012

SUMMARY OF THE INVENTION

The current specifications have a problem in that there is no mechanism for appropriately controlling transmission power used for the D2D communication. Thus, when transmission power used by a user terminal is large, the user terminal may apply interference to another user terminal existing in surroundings thereof or a base station.

On the other hand, when transmission power used by the user terminal is small, a range in which a D2D-use signal reaches is small, and thus, a user terminal capable of performing the D2D communication is limited. As a result, there is a problem that the D2D communication cannot be effectively utilized.

Further, there is a similar problem also in transmission power in the process of discovering the partner terminal in the D2D communication since there is no mechanism for appropriately controlling the transmission power used for the D2D communication in much the same way as the transmission power used for the D2D communication.

Therefore, the present invention provides a mobile communication system capable of appropriately controlling transmission power used for a process of discovering a partner terminal in D2D communication or for the D2D communication, a base station, a user terminal, and a processor.

BRIEF DESCRIPTION OF THE DRAWINGS

FIG. 9 is a sequence diagram illustrating an operation example of a mobile communication system according to a first embodiment.

MODE FOR CARRYING OUT THE INVENTION

Overview of Embodiment

Figure 1:
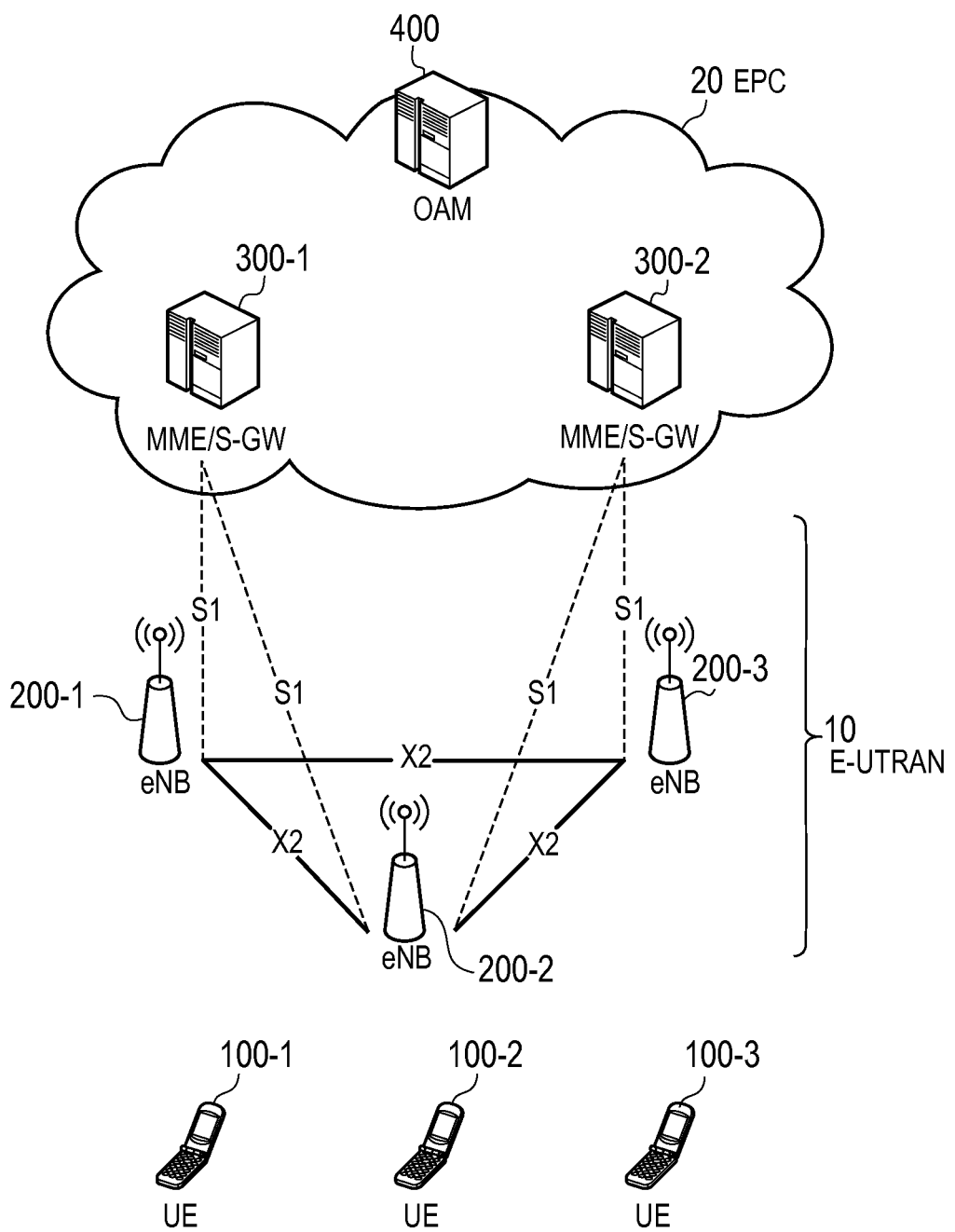
FIG. 1 is a configuration diagram of an LTE system.

A mobile communication system according to an embodiment is a mobile communication system that supports D2D communication that is direct device-to-device communication in which a data path does not pass through a core network, the mobile communication system has a user terminal that exists on a cell managed by a base station and a plurality of user terminals that include the user terminal and perform a process of discovering a partner terminal in the D2D communication or the D2D communication, in which a maximum value of transmission power used by the user terminal for the discovering process or the D2D communication is calculated so that the maximum value becomes larger according to the number of the plurality of user terminals, and the user terminal performs the discovering process or the D2D communication so that the transmission power does not exceed the maximum value. As a result, in a group of D2D communication with a large number of the plurality of user terminals that perform the D2D communication, an area in which D2D communication can be performed is expanded, and thus user terminals capable of performing the D2 D communication increase. As a result, the D2D communication can be utilized effectively. Further, traffic load of the base station can be reduced by causing the user terminal in a group with a large number of user terminals to perform D2D communication. On the other hand, in a group with a small number of user terminals that perform D2D communication, it is possible to suppress interference to surroundings applied by the user terminal by calculating the maximum value of the transmission power to be small. Thus, it is possible to appropriately control the transmission power used for the discovering process or the D2D communication.

In a first embodiment, the user terminal stores an equation used for calculating the maximum value, the base station transmits, to the user terminal, power control information including information indicating a coefficient included in the equation, and the user terminal calculates the maximum value on the basis of the equation and the power control information. As a result, the base station may not calculate maximum transmission power, and thus, a process load of the base station can be reduced.

In the first embodiment, the base station transmits, to the user terminal, terminal number information that is information indicating the number of the plurality of user terminals, and the user terminal calculates the maximum value on the basis of the equation, the power control information, and the terminal number information. As a result, the base station can reduce the amount of information to be transmitted compared with a case where the plurality of user terminals transmit all identifiers of each of the plurality of user terminals in order to decide the number of a plurality of users. Further, the plurality of user terminals can omit a process of deciding the number of the plurality of user terminals from an identifier of each of the plurality of user terminals.

In a second embodiment, the user terminal receives identifier information indicating the identifier of each of the plurality of user terminals from each of the plurality of user terminals, and the user terminal decides the number of the plurality of user terminals on the basis of the identifier information. As a result, even when the user terminal is in an idle state without establishing a connection with the base station, the user terminal itself can appropriately control the transmission power used for the D2D communication.

In a third embodiment, the mobile communication system comprises a network including the base station, the network receives information indicating the identifier of each of the plurality of user terminals, the network calculates the maximum value on the basis of the identifier, and the network transmits information indicating the maximum value to the user terminal. As a result, each UE 100 can omit calculation of the maximum transmission power and a process load is reduced.

In a fourth embodiment, the plurality of user terminals perform the D2D communication, when the user terminal determines that it is difficult to perform the D2D communication so that the transmission power does not exceed the maximum value, the user terminal transmits, to the base station, information indicating that the user terminal ends the D2D communication, the maximum value is calculated according to the number of remaining user terminals excluding the user terminal from the plurality of user terminals, and each of the remaining user terminals performs the D2D communication so that transmission power used by each of the remaining user terminals does not exceed the maximum value. As a result, it is possible to appropriately control the transmission power used for the D2D communication according to reduction in the number of the plurality of user terminals.

In the fourth embodiment, the information indicating that the D2D communication is ended includes information indicating that the user terminal performs communication via the base station with the remaining user terminals, and the user terminal performs communication via the base station with the remaining user terminals. As a result, the user terminal can avoid that the communication with the remaining user terminals is ended.

In a fifth embodiment, the base station transmits, to the user terminal, the power control information together with an instruction that the user terminal performs the discovering process, and the user terminal performs the discovering process so that the transmission power in the discovering process does not exceed the maximum value. As a result, when an instruction for performing the discovering process is received, it is possible to calculate the maximum value of the transmission power in the discovering process, and thus, it is possible to appropriately control the transmission power used for the discovering process.

In an embodiment, a base station in a mobile communication system that supports D2D communication that is direct device-to-device communication in which a data path does not pass through a core network comprising: a control unit that calculates a maximum value of transmission power used by a user terminal for a process of discovering a partner terminal in the D2D communication or for the D2D communication so that the maximum value becomes larger according to the number of a plurality of user terminals including the user terminal; and a transmission unit that transmits information indicating the maximum value to the user terminal.

In an embodiment, a user terminal in a mobile communication system that supports D2D communication that is direct device-to-device communication in which a data path does not pass through a core network, wherein the user terminal is included in a plurality of user terminals that perform a process of discovering a partner terminal in the D2D communication or the D2D communication, the user terminal has a control unit that calculates a maximum value of transmission power used by the user terminal for the discovering process or the D2D communication so that the maximum value becomes larger according to the number of the plurality of user terminals, and the control unit performs the discovering process or the D2D communication so that the transmission power does not exceed the maximum value.

In an embodiment, a processor provided in a base station in a mobile communication system that supports D2D communication that is direct device-to-device communication in which a data path does not pass through a core network, wherein the processor executes a process of calculating a maximum value of transmission power used by a user terminal for a process of discovering a partner terminal in the D2D communication or for the D2D communication so that the maximum value becomes larger according to the number of a plurality of user terminals including the user terminal, and executes a process of transmitting information indicating the maximum value to the user terminal.

In an embodiment, a processor provided in a user terminal in a mobile communication system that supports D2D communication that is direct device-to-device communication in which a data path does not pass through a core network, wherein the processor executes a process of calculating a maximum value of transmission power used by the user terminal for a process of discovering a partner terminal in the D2D communication or for the D2D communication so that the maximum value becomes larger according to the number of a plurality of user terminals including the user terminal, and executes a process of performing the discovering process or the D2D communication so that the transmission power does not exceed the maximum value.

Hereinafter, with reference to the accompanying drawings, the description will be provided for each embodiment when D2D communication is introduced to a cellular mobile communication system (hereinafter, an "LTE system") configured according to the 3GPP standards.

First Embodiment

Hereinafter, the first embodiment will be described.
(LTE System)
FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). Each eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GWs (Serving-Gateways) 300, and OAM 400 (Operation and Maintenance). Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
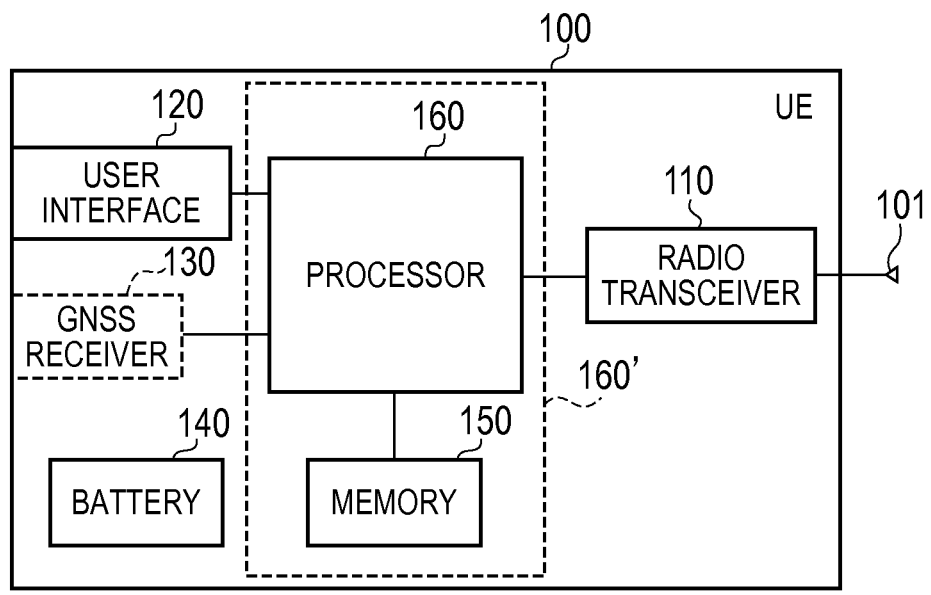
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
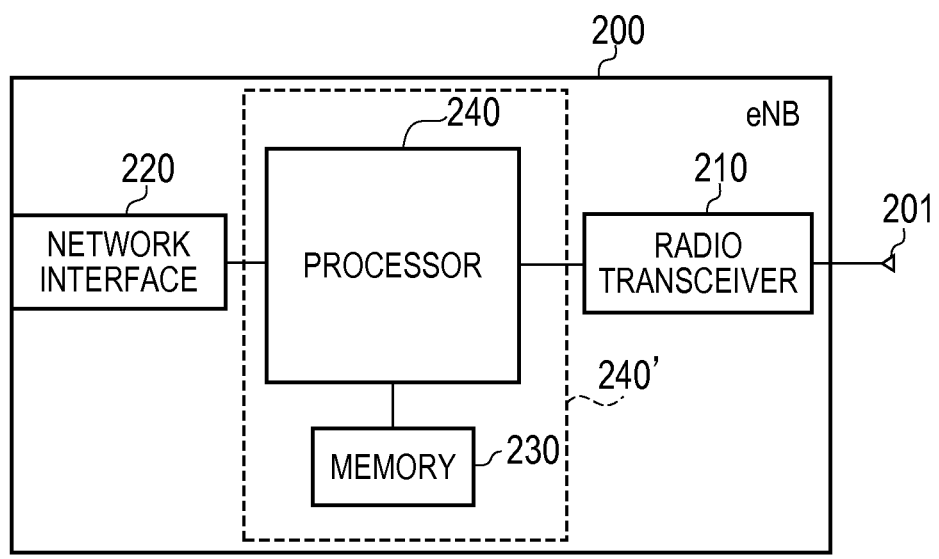
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
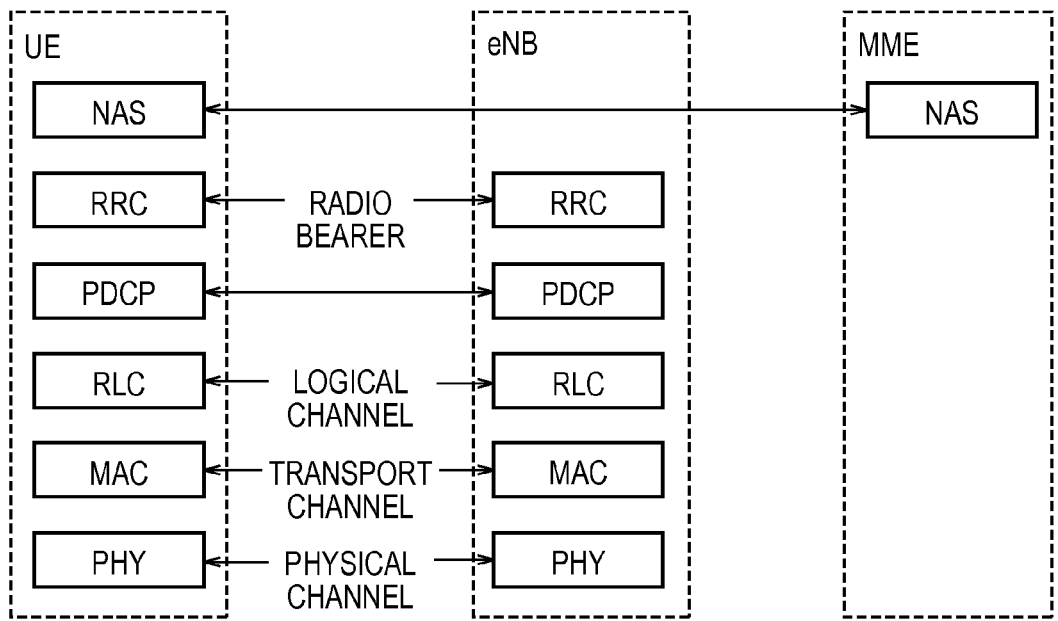
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC Layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

Figure 5:
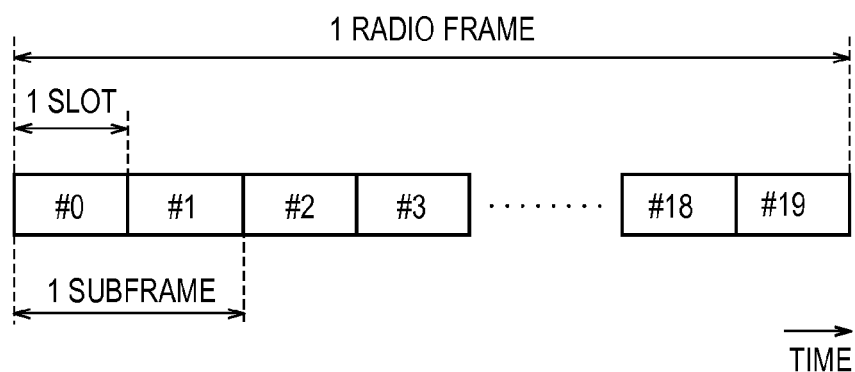
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (the cellular communication) in the LTE system.

Figure 6:
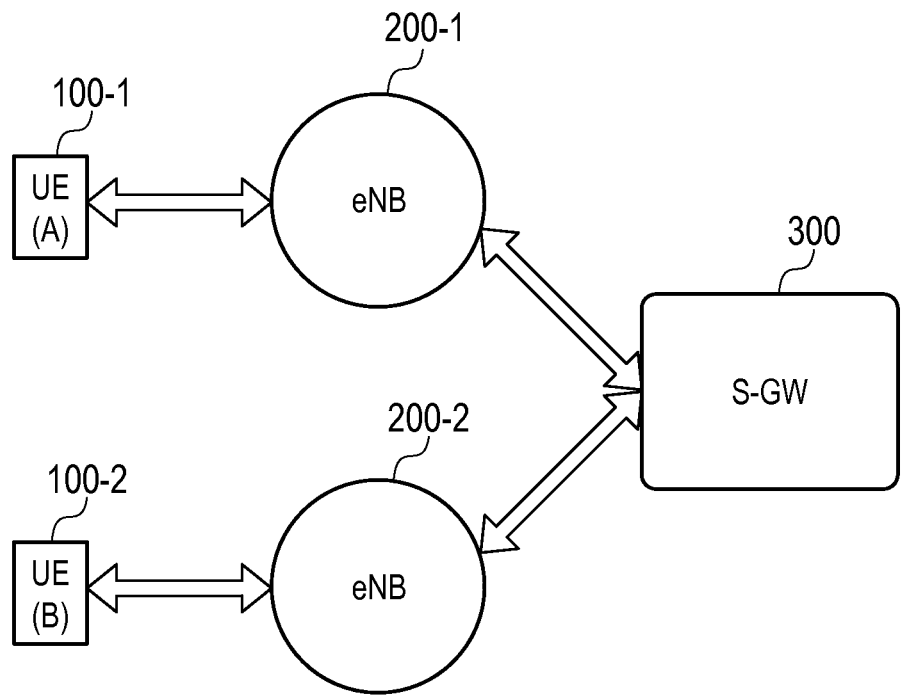
FIG. 6 is a diagram illustrating a data path in cellular communication.

FIG. 6 is a diagram illustrating a data path in the cellular communication. In this case, FIG. 6 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 6, the data path of the cellular communication passes through the network. Specifically, the data path is set to pass through the eNB 200-1, the S-GW 300, and the eNB 200-2.

Figure 7:
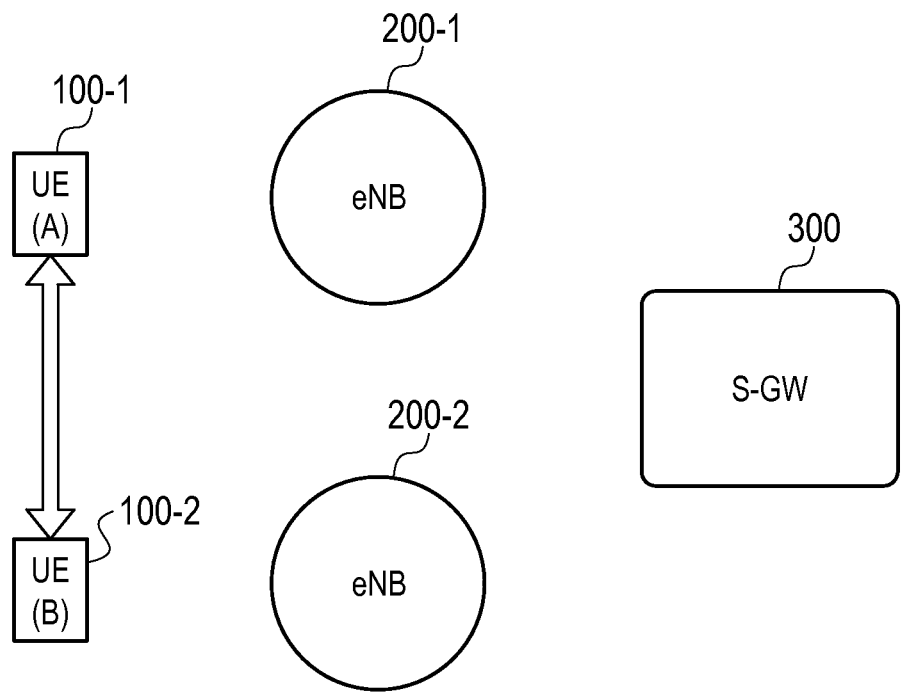
FIG. 7 is a diagram illustrating a data path in D2D communication.

FIG. 7 is a diagram illustrating a data path in the D2D communication. In this case, FIG. 7 illustrates the case in which the D2D communication is performed between the UE 100-1 that establishes a connection with the eNB 200-1 and the UE 100-2 that establishes a connection with the eNB 200-2.

As illustrated in FIG. 7, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, in a mode called Locally Routed (locally routed mode), a data path passes through the eNB 200 without passing through the S-GW 300.

It is noted that cases in which the D2D communication is started include (a) a case in which the D2D communication is started after a partner terminal is discovered by performing an operation for discovering a partner terminal, and (b) a case in which the D2D communication is started without performing an operation for discovering a partner terminal.

For example, in the above-described case (a), one UE 100 of the UE 100-1 and the UE 100-2 discovers the other UE 100 existing in the vicinity of the one UE 100, so that the D2D communication is started.

In such a case, in order to discover the partner terminal, the UE 100 has a (Discover) function of discovering another UE 100 existing in the vicinity of the UE 100, and/or a (Discoverable) function of being discovered by another UE 100.

Specifically, the UE100-1 transmits a discovery signal (Discovery signal/Discoverable signal) indicates a signal for discovering the partner terminal or a signal that is used to be discovered from the partner terminal. The UE 100-2 which received the discovery signal discovers the UE 100-1. When the UE 100-2 transmits a response to the discovery signal, the UE 100-1 that has transmitted the discovery signal discovers the UE 100-2, which is the partner terminal.

It is noted that the UE 100 need not necessarily perform the D2D communication even upon discovering a partner terminal. For example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. Additionally, the UE 100-1 may report the discovery of the proximal UE 100 (that is, the UE 100-2) to an upper layer (e.g. application, etc.), if the UE 100-1 did not perform the D2D communication after discovering the partner terminal. For example, the application executes the process (e.g. process of plotting the location of the UE 100-2 to the map information) based on the report.

Furthermore, the UE 100 may report the eNB 200 that the partner terminal has been discovered and may receive an instruction from the eNB 200 indicate the commutation with the partner terminal is performed in cellular communication or in the D2D communication.

On the other hand, in the above-described case (b), for example, the UE 100-1 starts the transmission (such as a notification through broadcasting) of a signal for the D2D communication without specifying a partner terminal. Thus, the UE 100 is capable of starting the D2D communication regardless of the existence of the discovery of a partner terminal. It is noted that the UE 100-2 that is performing the standby operation for the signal for the D2D communication performs synchronization or/and demodulation on the basis of the signal from the UE 100-1.

(Calculation of Maximum Value of Transmission Power)

Figure 8A:
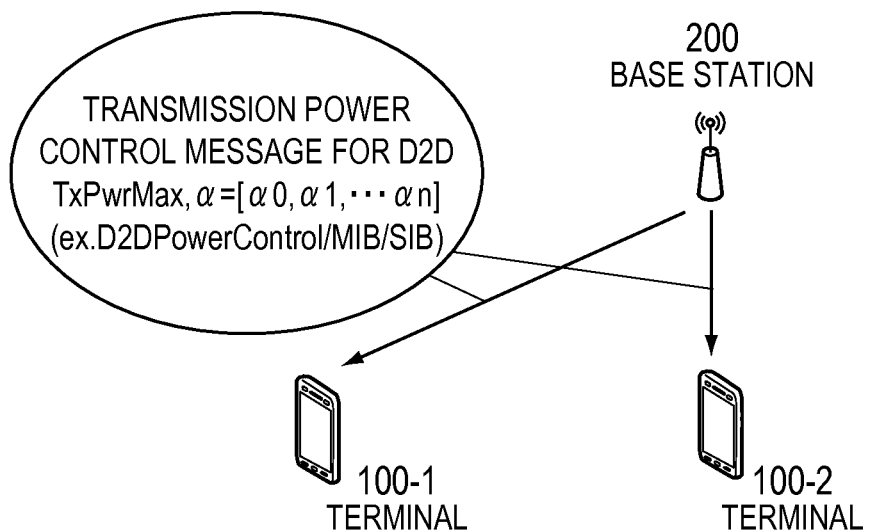
FIG. 8($a$) and FIG. 8($b$) are diagrams for explaining a method of calculating a maximum value of transmission power.
Figure 8B:
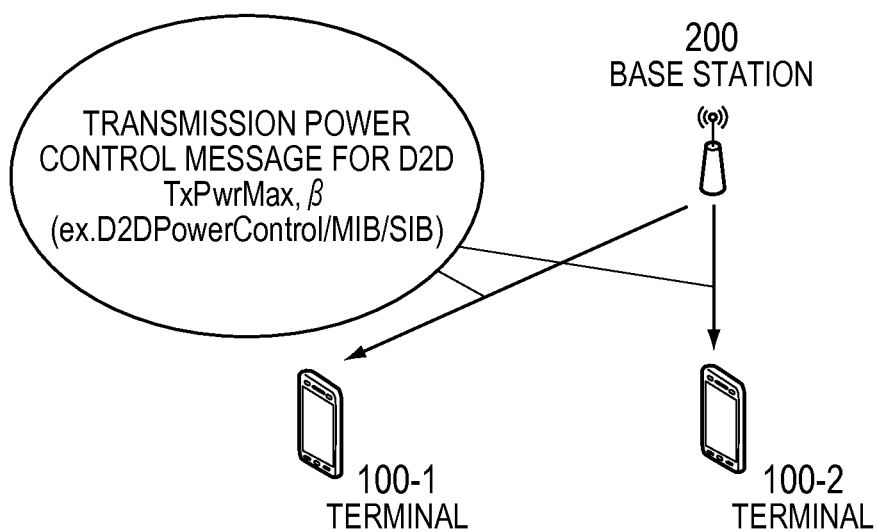

Next, by using FIG. 8(*a*) and FIG. 8(*b*), description will be provided for a method of calculating a maximum value of transmission power used by the UE 100 for the D2D communication.

FIG. 8(*a*) and FIG. 8(*b*) are diagrams for explaining a method of calculating the maximum value of the transmission power.

In the present embodiment, the UE 100-1 and the UE 100-2 calculates the maximum value of the transmission power (maximum transmission power) as described below. Thus, in a mobile communication system according to the present embodiment, the following operation is performed as a pre-operation for calculating the maximum value of the transmission power.

First, the UE 100-1 and the UE 100-2 store an equation used for calculating the maximum value of the transmission power used for the D2D communication. Specifically, the equation includes the following Equation 1 or Equation 2

First, the Equation 1 will be described.

$$TxPwrMax[numUE] = \begin{cases} \alpha[numUE-2] \times TxPwrMax & numUE-2 < n \\ \alpha[n] \times TxPwrMax & \text{otherwise} \end{cases}$$

$$\alpha = \{\alpha_0, \alpha_1, \ldots, \alpha_n\}: \alpha_0 \leq \alpha_1 \leq \ldots \leq \alpha_n$$

[Equation 1]

Herein, TxPwrMax[numUE] indicates a maximum value of transmission power. The maximum value of the transmission power is changed according to the number of the UEs 100 (numUE).

Specifically, in the Equation 1, when a value obtained by subtracting 2 from the number of the UEs 100 is smaller than n (numUE−2<n), the maximum value of the transmission power is obtained by TxPwrMax[numUE]=α[numUE−2]× TxPwrMax. As can be seen from an equation of a in the Equation 1, α[numUE−2] increases as the number of n becomes larger. Moreover, TxPwrMax is a predetermined coefficient.

Further, in the Equation 1, when the value obtained by subtracting 2 from the number of the UEs 100 is equal to or more than n, the maximum value of the transmission power is obtained by α[n]×TxPwrMax. α tends to increase according to the number of n, and thus, the maximum value of the transmission power becomes larger according to the number of the UEs 100 that perform the D2D communication.

When the UE 100-1 and the UE 100-2 calculate the maximum value of the transmission power, as illustrated in FIG. 8(*a*), the eNB 200 transmits, to the UE 100-1 and the UE 100-2, a transmission power control message for the D2D communication with respect to the Equation 1.

The transmission power control message for the D2D communication with respect to the Equation 1 includes information indicating TxPwrMax and α (α0, α1, . . . , αn).

The eNB 200 may transmit the transmission power control message in a unicast manner by D2D PowerControl, for example, or may transmit the transmission power control message in a broadcast manner by a master information block (MIB) or a system information block (SIB).

When the number of UEs in a group that performs the D2D communication is found by obtaining TxPwrMax and α included in the transmission power control message, the UE 100-1 and the UE 100-2 can obtain the maximum value of the transmission power.

Next, the Equation 2 will be described.

$$TxPwrMax[numUE] = TxPwrMax \times \beta \frac{numUE}{1 + numUE} \quad \text{[Equation 2]}$$

β is a coefficient. β(numUE)/(1+numUE) increases so as to approach 1 as the number of n increases.

When the UE 100-1 and the UE 100-2 calculate the maximum value of the transmission power, as illustrated in FIG. 8(*b*), the eNB 200 transmits, to the UE 100-1 and the UE 100-2, a transmission power control message for the D2D communication with respect to the Equation 2.

The transmission power control message for the D2D communication with respect to the Equation 2 includes information indicating TxPwrMax and β.

In much the same way as the above-described Equation 1, the eNB 200 transmits the transmission power control message in a unicast manner or a broadcast manner.

When the number of UEs in the group that performs the D2D communication is found by obtaining TxPwrMax and β included in the transmission power control message, the UE 100-1 and the UE 100-2 can obtain the maximum value of the transmission power.

In the present embodiment, the UE 100 stores information included in the equation and the transmission power control message described above before calculating the maximum value of the transmission power. As a result, when the number of UEs in the group that performs the D2D communication is found, the UE 100 can calculate the maximum value of the transmission power.

It is noted that the equation for calculating the maximum value of the transmission power may be stored in the UE 100 in advance or transmitted from the eNB 200.

(Operation of Mobile Communication System According to First Embodiment)

Next, by using FIG. 9, an operation of a mobile communication system according to the first embodiment will be described. FIG. 9 is a sequence diagram illustrating an operation example of the mobile communication system according to the first embodiment.

As illustrated in FIG. 9, the mobile communication system according to the present embodiment has the UE 100 (the UE 100-1, the UE 100-2, and UE 100-3), the eNB 200, and a network 300. The UE 100 exists on a cell managed by the eNB 200. The UE 100-1 and the UE 100-2 perform the D2D communication. The network 300, for example, is the upper station (MME) of the eNB 200.

As illustrated in FIG. 9, in step 101, the UE 100-3 transmits a discovery-use signal (hereinafter referred to as a Discovery signal). That is, the UE 100-3 performs a process of discovering a partner terminal (proximal terminal) in the D2D communication. Each of the UE 100-1 and the UE 100-2 receives the Discovery signal.

The Discovery signal is a signal for discovering a proximal UE 100 (a proximal terminal) that can be a communication partner in D2D communication or for being discovered by the proximal UE 100.

In the present embodiment, the Discovery signal includes an identifier (terminal 3) indicating the UE 100-3 and an application identifier indicating an application to be used in the D2D communication.

In step 102, the UE 100-1 transmits a response signal for the Discovery signal (a Discovery response signal). Further, the UE 100-2 transmits a Discovery response signal. The UE 100-3 receives the Discovery response signal from the UE 100-1 and the Discovery response signal from the UE 100-2.

The Discovery response signal transmitted from the UE 100-1 includes an identifier (terminal 1) indicating the UE 100-1 from which the signal is transmitted, an identifier (terminal 2) indicating the UE 100-2 with which the UE 100-1 performs D2D communication, the identifier (terminal 3) indicating the UE 100-3 from which the Discovery signal is transmitted, and the application identifier. The Discovery response signal transmitted from the UE 100-2 similarly includes the terminal 1, the terminal 2, the terminal 3, and the application identifier.

In step 103, the UE 100-3 transmits the Discovery response signal to the network 300. The network 300 receives the Discovery response signal.

Herein, the Discovery response signal received by the network 300 is a signal requesting the D2D communication to be performed. The Discovery response signal includes the terminal 1, the terminal 2, and the terminal 3 as identifiers of the UE 100 scheduled to perform the D2D communication, and the application identifier.

In step 104, the network 30 updates a D2D group as a group that performs the D2D communication. Specifically, the network 300 updates a D2D group from a D2D group including the UE 100-1 and the UE 100-2 to a D2D group including the UE 100-1, the UE 100-2, and the UE100-3. Further, the network 300 updates the number of UEs from 2 to 3.

In step 105, the network 300 transmits, to the eNB 200, a D2D instruction that the UE 100 performs the D2D communication. The eNB 200 receives the D2D instruction.

The D2D instruction includes the terminal 1, the terminal 2, and the terminal 3 as identifiers of the UEs 100 that perform the D2D communication, and the application identifier.

In step 106, the eNB 200 transmits the D2D instruction to the UE 100-1, the UE 100-2, and the UE100-3. Each of the UE 100-1, the UE 100-2, and the UE 100-3 receives the D2D instruction.

In step 107, each of the UE 100-1, the UE 100-2, and the UE 100-3 updates setting of the maximum transmission power. Specifically, the number of UEs constituting the D2D group is decided according to the number of identifiers of the UEs 100 included in the D2D instruction. In the present embodiment, each of the UEs 100 (the UE 100-1, the UE 100-2, and the UE 100-3) decides that the number of UEs is 3.

Next, each UE 100 calculates the maximum value so that the maximum value of the transmission power used for the D2D communication becomes larger according to the number of UEs. Specifically, the maximum transmission power TxPwrMax[numUE] is calculated by substituting the number of UEs (3) into the above-described equation.

In the present embodiment, since the number of UEs in the D2D group is changed from 2 to 3, the maximum transmission power of the UE 100-1 and the UE 100-2 is increased.

Each of the UEs 100 (the UE 100-1, the UE 100-2, and the UE 100-3) performs the D2D communication so that the transmission power used for the D2D communication does not exceed the maximum transmission power TxPwrMax [numUE].

(Operation of Mobile Communication System According to First Modification of First Embodiment)

Next, by using FIG. 10, an operation of a mobile communication system according to a first modification of the first embodiment will be described. It is noted that description will be provided while focusing a portion different from the above-described embodiment, and description of a similar portion will be omitted, where necessary.

The above-described first embodiment is different from the present modification in terms of information included in the D2D instruction performed by the network 300.

Figure 10:
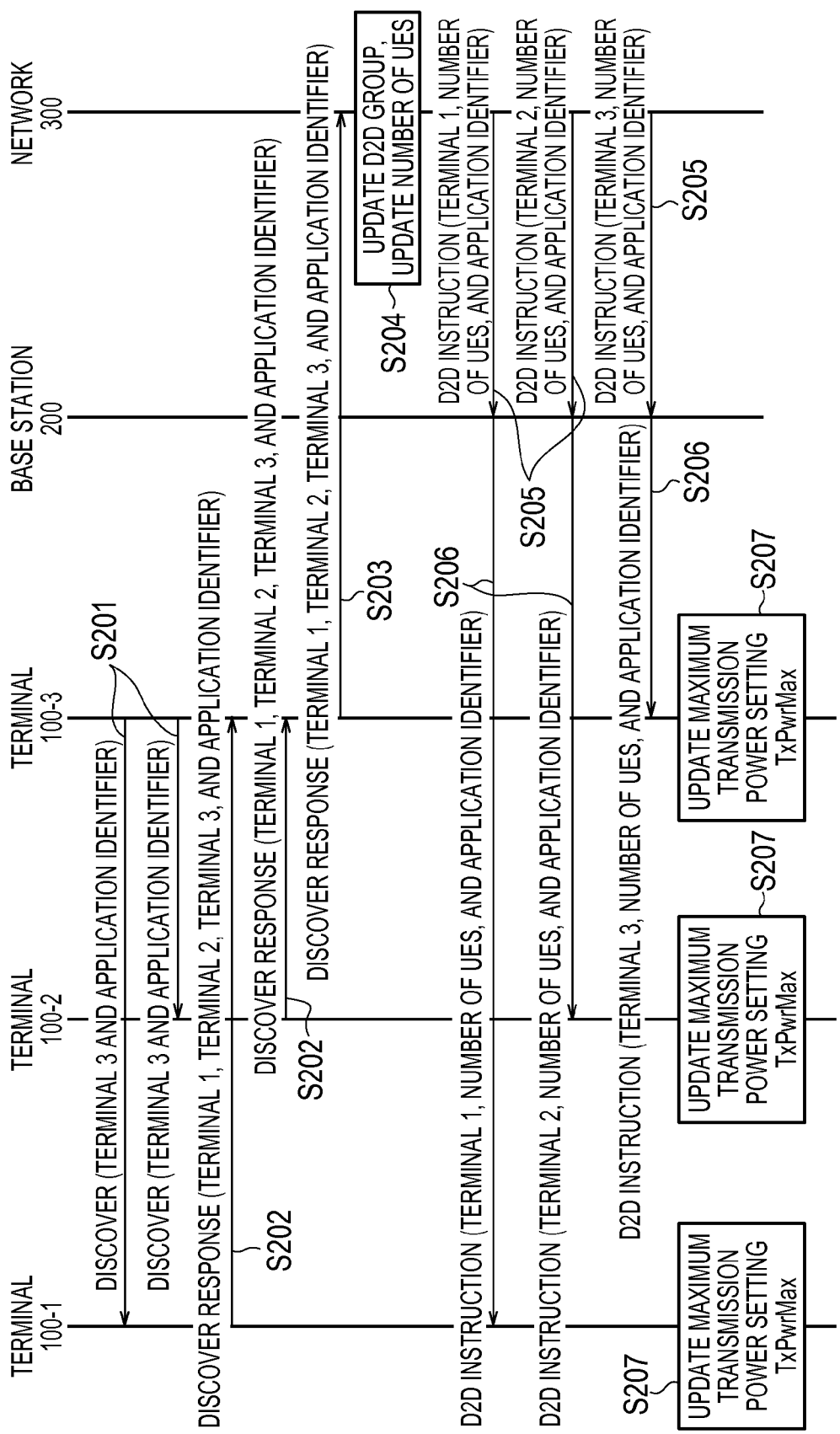
FIG. 10 is a sequence diagram illustrating an operation example of a mobile communication system according to a first modification of the first embodiment.

FIG. 10 is a sequence diagram illustrating an operation example of the mobile communication system according to the first modification of the first embodiment.

Steps 201 to 204 correspond to steps 101 to 104 in the first embodiment.

As illustrated in FIG. 10, in step 205, the network 300 transmits, to the eNB 200, a D2D instruction that the UE 100 performs the D2D communication.

Herein, the D2D instruction includes an identifier indicating each UE 100 to which the D2D instruction is finally reached, the number of UEs constituting the D2D group, and the application identifier.

In step 206, the eNB 200 transmits the D2D instruction to the UE 100-1, the UE 100-2, and the UE100-3. Each UE 100 receives the D2D instruction including the identifier of the UE 100.

In step 207, each of the UE 100-1, the UE 100-2, and the UE 100-3 updates setting of the maximum transmission power. Herein, the D2D instruction includes the number of UEs of the D2D group, and thus, each UE 100 can omit a process of deciding the number of UEs constituting the D2D group according to the number of identifiers of the UEs 100 included in the D2D instruction. Each UE 100 calculates the maximum transmission power TxPwrMax[numUE] by substituting the number of UEs included in the D2D instruction into the equation.

(Operation of Mobile Communication System According to Second Modification of First Embodiment)

Next, by using FIG. 11, an operation of a mobile communication system according to a second modification of the first embodiment will be described. It is noted that description will be provided while focusing a portion different from the above-described embodiment and modification, and description of a similar portion will be omitted, where necessary.

The above-described first modification of the first embodiment is different from the present modification in terms of a trigger with which the UE 100-3 transmits the Discovery signal.

In the present modification, the UE 100-1, the UE 100-2, and the UE 100-3 perform cellular communication via the eNB200.

Figure 11:
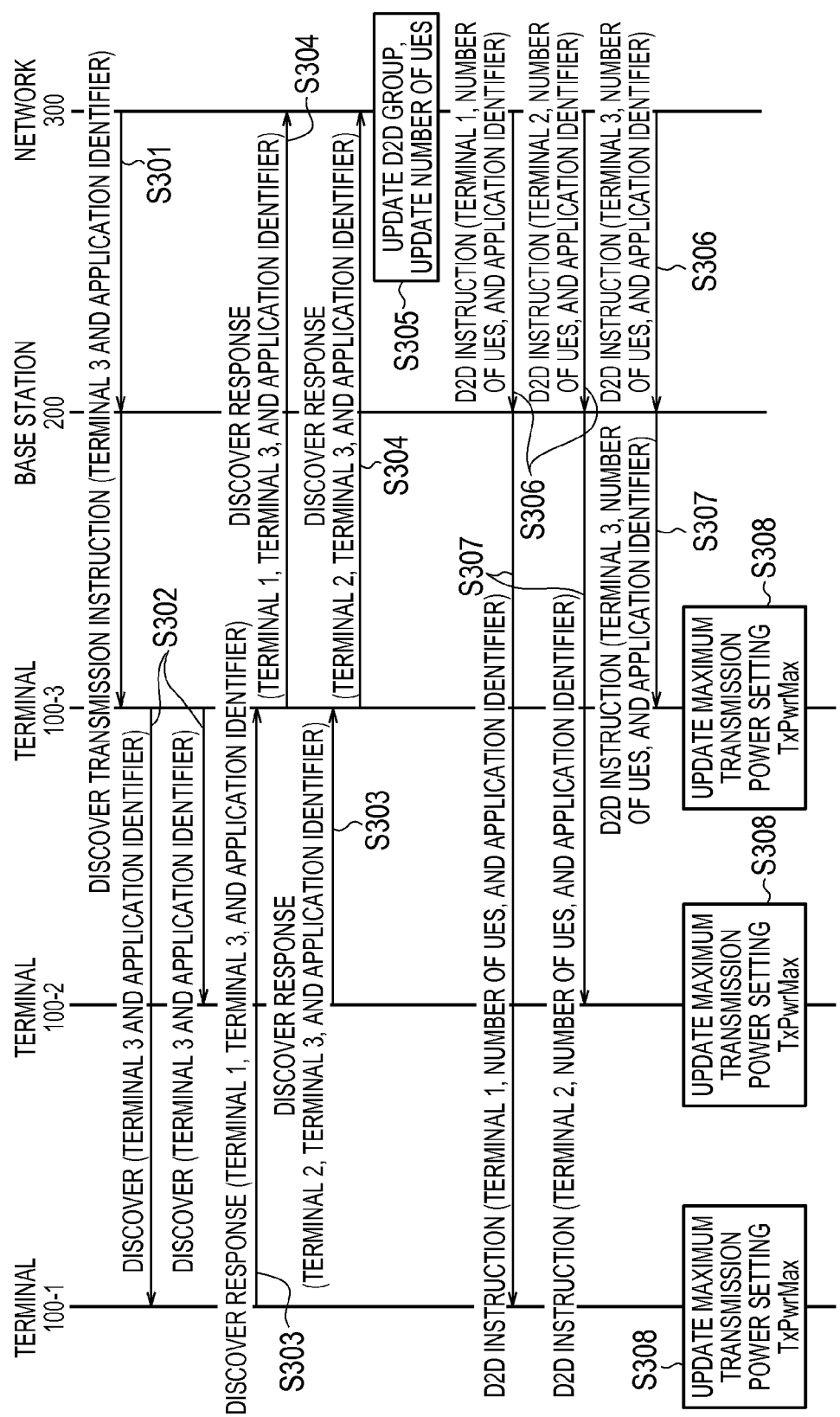
FIG. 11 is a sequence diagram illustrating an operation example of a mobile communication system according to a second modification of the first embodiment.

FIG. 11 is a sequence diagram illustrating an operation example of the mobile communication system according to the second modification of the first embodiment.

As illustrated in FIG. 11, in step 301, the network 300 performs, via the eNB 200, a Discovery transmission instruction that the UE 100-3 transmits a Discovery signal. The Discovery transmission instruction includes the terminal 3 indicating the UE 100-3 as a transmission target and the application identifier.

Step 302 corresponds to step 201 in the first modification of the first embodiment.

In step 303, the UE 100-1 transmits a Discovery response signal. Further, the UE 100-2 transmits a Discovery response signal. The UE 100-3 receives the Discovery response signal from the UE 100-1 and the Discovery response signal from the UE 100-2.

The Discovery response signal transmitted from the UE 100-1 includes the terminal 1 indicating the UE 100-1 from which the signal is transmitted, the terminal 3 indicating the UE 100-3 to which the signal is transmitted, and the application identifier. The Discovery response signal transmitted from the UE 100-2 similarly includes the terminal 1, the terminal 3, and the application identifier.

In step 304, the UE 100-transmits a Discovery response signal to the network 300. The network 300 receives the Discovery response signal.

The network 300 transmits a Discovery response signal corresponding to the Discovery response signal transmitted from the UE 100-1. That is, the Discovery response signal transmitted by the UE100-3 is a signal including information similar to that of the Discovery response signal transmitted from the UE 100-1. Similarly, the Discovery response signal transmitted by the UE100-3 is a signal including information similar to that of the Discovery response signal transmitted from the UE 100-2.

Steps 305 to 308 correspond to steps 104 to 107.

(Summary of First Embodiment)

Figure 12:
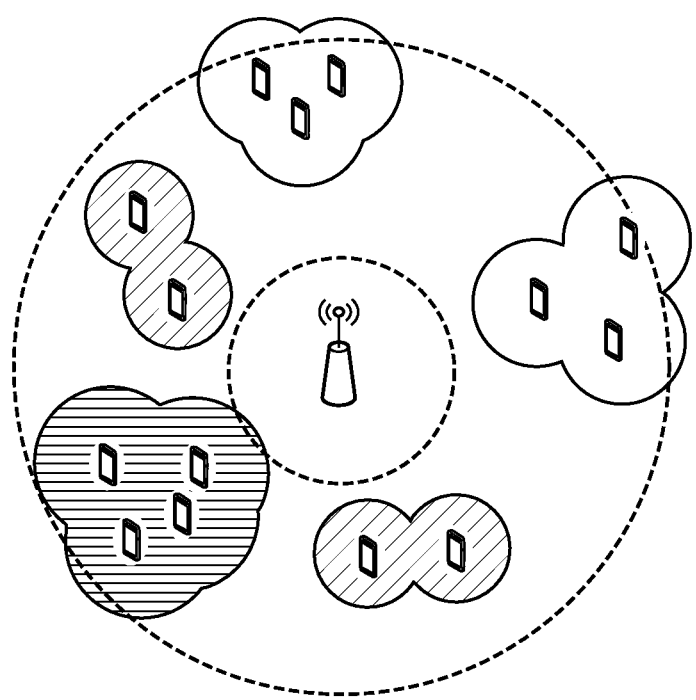
FIG. 12 is a diagram for explaining difference in magnitude of transmission power in the D2D communication.

In the present embodiment, the maximum transmission power is calculated so that the maximum transmission power becomes larger according to the number of UEs. As a result, as illustrated in FIG. 12, in a D2D group with a large number of UEs 100 that perform the D2D communication, an area in which D2D communication can be performed is expanded, and thus, user terminals capable of performing the D2D communication are increased. As a result, the D2D communication can be utilized effectively. Further, a traffic load of the eNB 200 can be reduced by causing the D2D group with a large number of UEs 100 to perform D2D communication. On the other hand, as illustrated in FIG. 12, in a group with a small number of the UEs 100 that perform D2D communication, it is possible to suppress interference to surroundings applied by the UE 100 by calculating the maximum transmission power to be small. Thus, it is possible to appropriately control the transmission power used for the D2D communication.

In the present embodiment, the UE 100 stores the equation in order to calculate the maximum transmission power, the eNB 200 transmits the power control information to the UE 100, and the UE 100 calculates the maximum transmission power on the basis of the equation and the transmission power control message. As a result, the eNB 200 may not calculate the maximum transmission power, and thus, the process load of the eNB 200 can be reduced.

In the present embodiment, the eNB 200 transmits the number of UEs to each UE 100, and each UE 100 calculates the maximum transmission power on the basis of the equation, the transmission power control message, and the number of UEs. As a result, the eNB 200 can reduce the amount of information to be transmitted compared with a case where each UE 100 transmits all identifiers of each UE 100 in order to decide the number of UEs. Further, each UE 100 can omit a process of deciding the number of UEs from an identifier of each UE 100.

Second Embodiment (Operation of Mobile Communication System According to Second Embodiment)

Next, by using FIG. 13, an operation of a mobile communication system according to the second embodiment will be described. It is noted that description will be provided while focusing a portion different from the embodiment and each modification described above, and description of a similar portion will be omitted, where necessary.

In the above-described first embodiment, the maximum transmission power is set by employing the D2D instruction from the eNB 200 as a trigger, however, in the present embodiment, the maximum transmission power is set without the trigger from the eNB 200.

Figure 13:
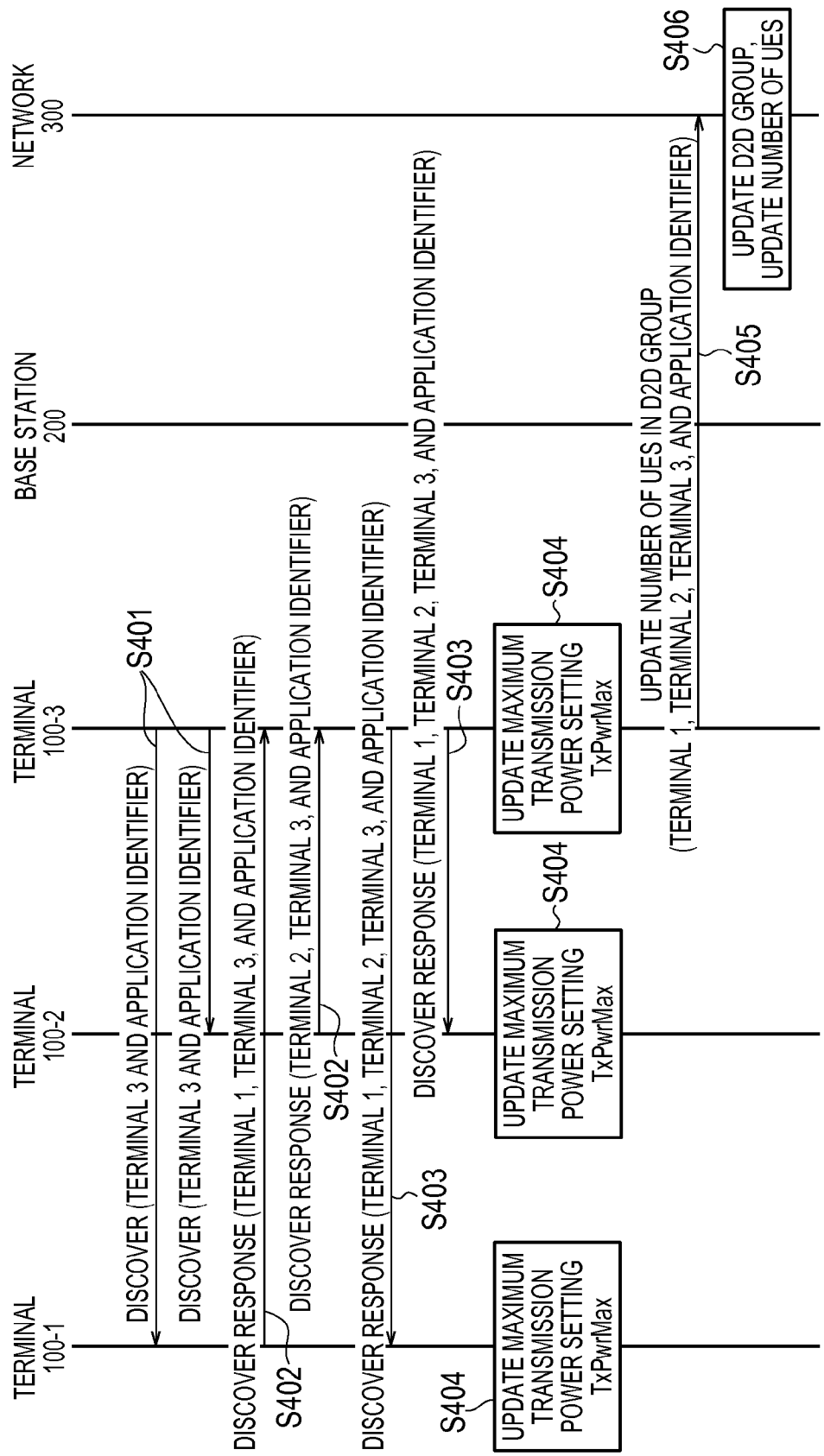
FIG. 13 is a sequence diagram illustrating an operation example of a mobile communication system according to a second embodiment.

FIG. 13 is a sequence diagram illustrating an operation example of the mobile communication system according to the second embodiment.

Steps 401 and 402 correspond to steps 301 and 302 in the second modification of the first embodiment.

In step 403, the UE 100-3 transmits a Discovery response signal to each of the UE 100-1 and the UE 100-2. Herein, the Discovery response signal is a response to the Discovery response signal from each of the UE 100-1 and the UE 100-2 in step 402.

The UE 100-3 stores the identifiers, of the UEs 100 that perform the D2D communication, included in the Discovery response signal in step 402. The UE 100-3 transmits a Discovery response signal including identifiers of all UEs 100 that perform the D2D communication. Accordingly, the Discovery response signal in step 403 includes the terminal 1, the terminal 2, and the terminal 3.

In step 404, each of the UE 100-1 and the UE 100-2 decides the number of UEs constituting a D2D group according to the number of identifiers of the UEs 100 included in the Discovery response signal. The UE 100-3 decides the number of UEs on the basis of the stored identifiers of the UEs 100. Each UE 100 updates setting of the maximum transmission power.

In step 405, the UE 100-3 transmits information for updating the number of UEs in the D2D group. This information includes the identifier of each UE 100 and the application identifier.

In step 406, the network 300 updates the D2D group that performs the D2D communication.

(Summary of Second Embodiment)

In the present embodiment, the UE 100-3 receives each identifier of each UE 100 from each UE 100, and the UE 100-3 decides the number of UEs on the basis of the identifier. As a result, even when the UE 100 does not establish a connection with the eNB 200 (the UE 100 is in an idle state), the UE 100 itself can appropriately control transmission power used for D2D communication.

Third Embodiment (Operation of Mobile Communication System According to Third Embodiment)

Next, by using FIG. 14, an operation of a mobile communication system according to the third embodiment will be described. It is noted that description will be provided while focusing a portion different from the embodiment and each modification described above, and description of a similar portion will be omitted, where necessary.

In the above-described first embodiment, the UE 100 calculates the maximum transmission power, however, in the present embodiment, the network 300 calculates the maximum transmission power.

Figure 14:
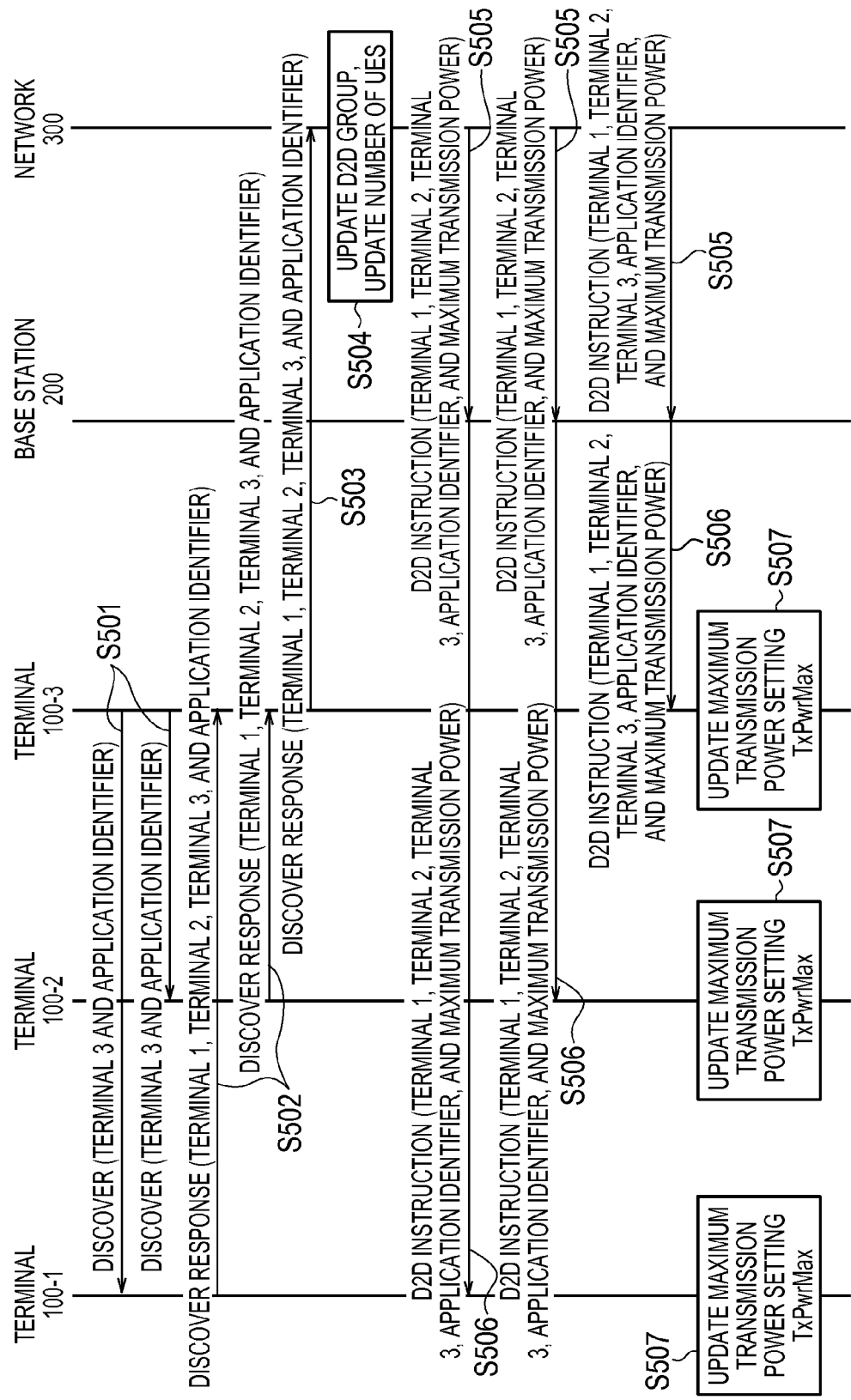
FIG. 14 is a sequence diagram illustrating an operation example of a mobile communication system according to a third embodiment.

FIG. 14 is a sequence diagram illustrating an operation example of the mobile communication system according to the third embodiment.

Steps 501 to 504 correspond to steps 101 to 104 in the first embodiment.

In step 505, the network 300 transmits, to the eNB 200, the D2D instruction that the UE 100 performs D2D communication. The eNB 200 receives the D2D instruction.

The D2D instruction includes information indicating the maximum transmission power in addition to the terminal 1, the terminal 2, and the terminal 3 as identifiers of the UEs 100 that perform the D2D communication, and the application identifier.

The network 300 calculates the maximum transmission power of the D2D group on the basis of the number of UEs updated on the basis of the identifier of each UE 100 in step 504. Information indicating the calculated maximum transmission power is included in the D2D instruction.

In step 506, the eNB 200 transmits, to each UE 100, the D2D instruction including information indicating the maximum transmission power. Each of the UE 100-1, the UE 100-2, and the UE 100-3 receives the D2D instruction.

In step 507, each UE 100 updates setting of the maximum transmission power on the basis of the maximum transmission power included in the D2D instruction.

(Summary of Third Embodiment)

In the present embodiment, the network 300 calculates the maximum transmission power on the basis of the identifier of each UE 100, and the network 300 transmits the maximum transmission power to each UE 100. As a result, each UE 100 can omit calculation of the maximum transmission power.

Fourth Embodiment (Operation of Mobile Communication System According to Fourth Embodiment)

Next, by using FIG. 15, an operation of a mobile communication system according to the fourth embodiment will be described. It is noted that description will be provided while focusing a portion different from the embodiment and each modification described above, and description of a similar portion will be omitted, where necessary.

In the above-described first embodiment, the UE 100-3 that is not performing the D2D communication starts the D2D communication, however, in the present embodiment, the UE 100-3 that is performing the D2D communication ends the D2D communication.

Figure 15:
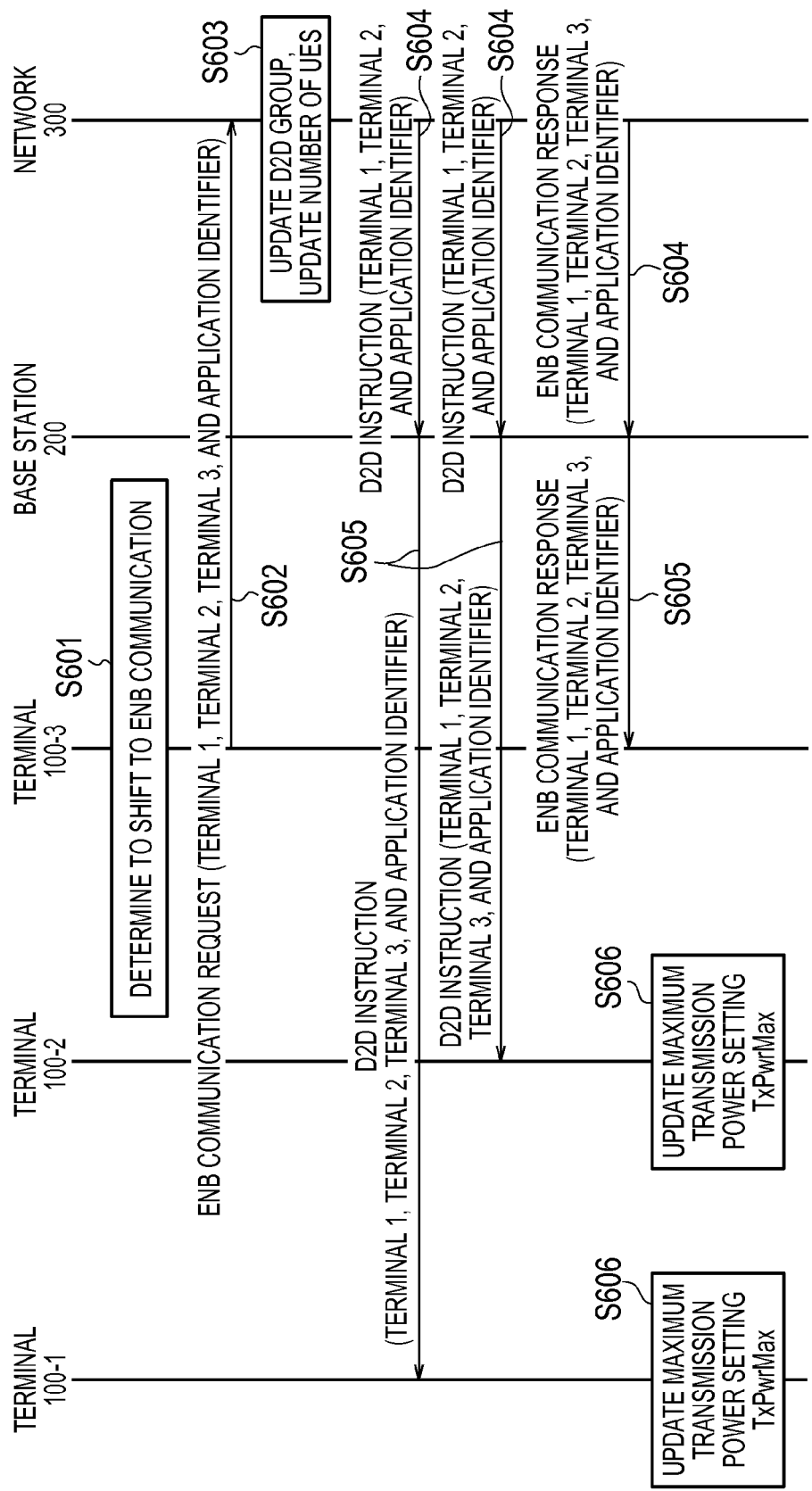
FIG. 15 is a sequence diagram illustrating an operation example of a mobile communication system according to a fourth embodiment.

FIG. 15 is a sequence diagram illustrating an operation example of a mobile communication system according to the fourth embodiment.

In the present embodiment, the UE 100-1, the UE 100-2, and the UE 100-3 perform the D2D communication.

As illustrated in FIG. 15, in step 601, the UE 100-3 determines whether or not to perform cellular communication via the eNB200. Specifically, when determining that it is difficult to perform the D2D communication so as not to exceed the maximum transmission power, the UE 100-3 determines to perform the cellular communication via the eNB200. For example, when received power intensity from the UE 100-1 or the UE 100-2 is equal to or less than a predetermined value, the UE 100-3 determines that it is difficult to perform the D2D communication so as not to exceed the maximum transmission power.

In the present embodiment, a description will be provided on the assumption that the UE 100-3 determines that it is difficult to perform the D2D communication and determines to end the D2D communication.

In step 602, the UE 100-3 requests the eNB 200 to perform the cellular communication via the eNB 200. The network 300 receives a request indicating that the cellular communication is performed.

This request includes the terminal 1 and the terminal 2 as information indicating an identifier of a communication partner terminal in the D2D communication, the terminal 3 as the identifier of the transmission source, and the application identifier.

In step 603, the network 300 updates the D2D group. Specifically, the network 300 updates a D2D group from a D2D group including the UE 100-1, the UE 100-2, and the UE 100-3 to a D2D group including the UE 100-1 and the UE 100-2. Further, the network 300 updates the number of UEs from 3 to 2.

In step 604, the network 300 transmits, to the eNB 200, the D2D instruction that each of the UE 100-1 and the UE 100-2 performs the D2D communication. On the other hand, the network 300 transmits, to the eNB 200, an eNB communication response for causing the UE 100-3 to perform the cellular communication.

The D2D instruction includes the terminal 1 and the terminal 2 as identifiers of the UEs 100 that perform the D2D communication, and the application identifier. The identifier of the UE 100-3 is not included. On the other hand, the eNB communication response includes the terminal 1, the terminal 2, and the terminal 3 as identifiers of the UEs 100 that perform the cellular communication, and the application identifier indicating an application used in the cellular communication.

In step 605, the eNB 200 transmits the D2D instruction to each of the UE 100-1 and the UE 100-2. On the other hand, the eNB 200 transmits the eNB communication response to the UE 100-3.

In step 606, each of the UE 100-1 and the UE 100-2 updates setting of the maximum transmission power. Specifically, the maximum transmission power is calculated on the basis of 2 as the number of UEs of the UE 100-1 and the UE 100-2.

In the present embodiment, since the number of UEs in the D2D group of the E 100-1 and the UE 100-2 is changed from 3 to 2, the maximum transmission power of the UE 100-1 and the UE 100-2 is reduced.

The UE 100-3 performs cellular communication via the eNB 200 with each of the UE 100-1 and the UE 100-2.

(Summary of Fourth Embodiment)

In the present embodiment, when determining that it is difficult to perform the D2D communication so that the transmission power does not exceed the maximum transmission power, the UE 100-3 transmits, to the eNB 200, information indicating that the D2D communication is ended, the maximum transmission power is calculated according to the number of the UE 100-1 and the UE 100-2, and each of the UE 100-1 and the UE 100-2 performs the D2D communication so that the transmission power does not exceed the maximum transmission power. As a result, it is possible to appropriately control transmission power used for D2D communication according to reduction in the number of the UEs.

In the present embodiment, the UE 100-3 requests the communication via the eNB 200 to be performed, and the UE 100-3 performs cellular communication via the eNB 200 with the UE 100-1 and the UE 100-2. As a result, the UE 100-3 can avoid that the communication with the UE 100-1 and the UE 100-2 is ended.

Fifth Embodiment (Operation of Mobile Communication System According to Fifth Embodiment)

Next, by using FIG. 16, an operation of a mobile communication system according to the fifth embodiment will be described. It is noted that description will be provided while focusing a portion different from the embodiment and each modification described above, and description of a similar portion will be omitted, where necessary.

In the above-described second modification of the first embodiment, the Discovery transmission instruction includes the application identifier, however, in the present embodiment, the Discovery transmission instruction includes transmission power information in addition to the application identifier.

Figure 16:
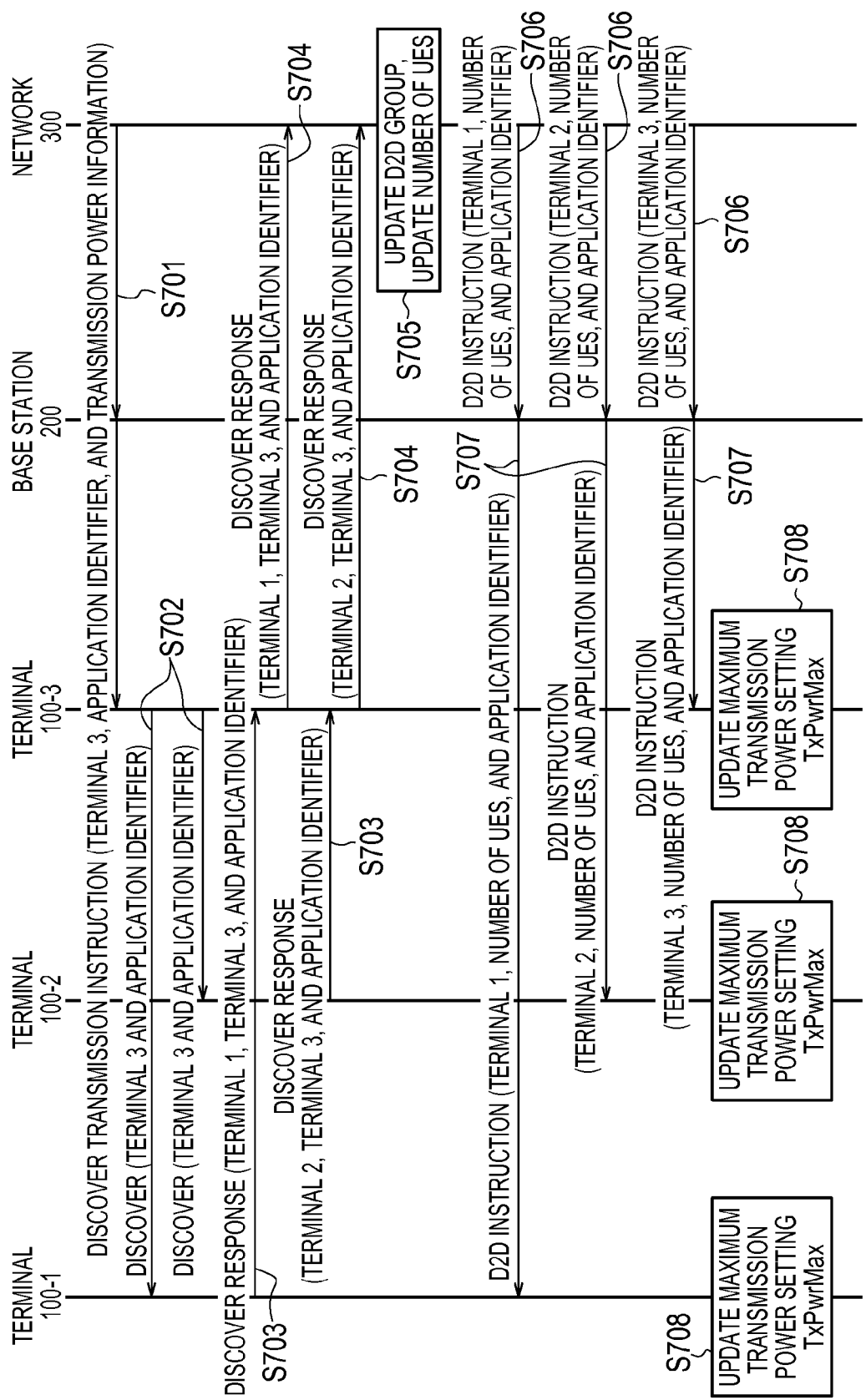
FIG. 16 is a sequence diagram illustrating an operation example of a mobile communication system according to a fifth embodiment.

FIG. 16 is a sequence diagram illustrating an operation example of a mobile communication system according to the fifth embodiment.

In the present embodiment, the UE 100-1, the UE 100-2, and the UE 100-3 perform cellular communication via the eNB200.

As illustrated in FIG. 16, in step 701, the network 300 performs a Discovery transmission instruction, via the eNB 200, to the UE 100-3 to transmit a Discovery signal. The UE 100-3 receives the Discovery transmission instruction. The Discovery transmission instruction includes the terminal 3 indicating the UE 100-3 as a transmission target, the application identifier, and the transmission power information.

Herein, the transmission power information is information used in the case of calculating the maximum value of the transmission power of the Discovery signal, and information similar to the transmission power control message. Accordingly, for example, the transmission power information may be a coefficient γ corresponding to the coefficient β, and a coefficient MaxTxPower of the maximum value of the transmission power of the Discovery signal corresponding to the coefficient TxPwrMax of the maximum value of the transmission power for the D2D communication.

In step 702, the UE 100-3 transmits a Discovery signal.

Herein, the UE 100-3 calculates the maximum value (MaxTxPower[numUE]) of the transmission power of the Discovery signal on the basis of the transmission power information. In the present embodiment, the UE 100-3 does not perform the D2D communication, and thus, the number of UEs is decided as 0. Alternatively, the number of UEs may be 3 on the assumption that the group includes the UE 100-1, the UE 100-2, and the UE 100-3 since the UE 100-3 performs the D2D communication with the UE 100-1 and the UE 100-2 that have been performing the cellular communication.

The UE 100-3 calculates the maximum value of the transmission power of the Discovery signal on the basis of the above-mentioned equation, the number of UEs, and the transmission power information.

The UE 100-3 transmits the Discovery signal so as not to exceed the calculated maximum value and performs a discovering process. Each of the UE 100-1 and the UE 100-2 receives the Discovery signal.

Steps 703 to 708 correspond to steps 303 to 308 of the second modification in the first embodiment, respectively.

(Summary of Fifth Embodiment)

In the present embodiment, the network 300 transmits the transmission power information to the UE 100-3, transmits the Discovery transmission instruction to the UE 100-3, and the UE 100-3 performs a discovering process so as not to exceed the maximum value (MaxTxPower [numUE]). As a result, the maximum value of the transmission power of the Discovery signal can be calculated when receiving the Discovery transmission instruction, and thus, it is possible to appropriately control the transmission power used for the Discovery signal (discovering process).

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

For example, in the above-described fourth embodiment, cellular communication is performed, however, communication may be performed in a mode called Locally Routed (locally routed mode) that passes through the eNB 200 and does not pass through the core network.

Further, in the fourth embodiment, the UE100-3 requests the eNB 200 to perform the cellular communication via the eNB 200, however, the embodiment is not limited thereto. For example, the UE 100-3 may transmit, via the eNB 200, to the network 300, D2D termination information indicating that the D2D communication is ended. In this case, the network 300 transmits, via the eNB 200, to the UE 100-3, D2D termination instruction to end the D2D communication by the UE 100-3. As a result, the UE 100-3 ends the D2D communication. On the other hand, the UE 100-1 and the UE 100-2 continue the D2D communication so as not to exceed the reduced maximum transmission power in much the same way as the fourth embodiment.

Further, in the fifth embodiment, the network 300 may include information indicating the number of UEs used in calculating the maximum value (MaxTxPower[numUE]) of the transmission power of the Discovery signal, into the Discovery transmission instruction. For example, the network 300 may transmit information indicating that the number of UEs is 3 in the Discovery transmission instruction so that the UE 100-3 performs the D2D communication with the UE 100-1 and the UE 100-2 that have been performing the cellular communication.

Needless to say, each of the above-described embodiments and modifications may be combined, where necessary.

Each of the aforementioned embodiments has described an example in which the present invention is applied to the LTE system. However, the present invention may also be applied to systems other than the LTE system, as well as the LTE system.

In addition, the entire content of U.S. Provisional Application No. 61/766,488 (filed on Feb. 19, 2013) is incorporated in the present specification by reference.

INDUSTRIAL APPLICABILITY

As described above, the mobile communication system, the base station, the user terminal according to the present invention are able to appropriately controlling transmission power used for a process of discovering a partner terminal in D2D communication or for the D2D communication, thus they are useful for a mobile communication field.

The invention claimed is:

1. A mobile communication system that supports D2D communication that is direct device-to-device communication in which a data path does not pass through a core network, comprising:
   a user terminal that exists on a cell managed by a base station; and
   a plurality of user terminals that include the user terminal and that perform a discovery process or the D2D communication, the discovery process being a process of discovering a proximal terminal, wherein
   the user terminal stores an equation used for calculating a maximum value of transmission power used by the user terminal for the discovery process or the D2D communication,
   the base station transmits, to the user terminal, power control information indicating a coefficient included in the equation and terminal number information indicating the number of the plurality of user terminals,
   the user terminal calculates the maximum value on the basis of the equation, the power control information, and the terminal number information, wherein the maximum value becomes larger as the number of the plurality of user terminals becomes larger, and
   the user terminal performs the discovery process or the D2D communication so that the transmission power does not exceed the maximum value.

2. The mobile communication system according to claim 1, wherein
   the plurality of user terminals perform the D2D communication,
   in response to determining that performing the D2D communication will cause the transmission power to exceed the maximum value, the user terminal transmits, to the base station, information indicating that the user terminal ends the D2D communication,
   the maximum value is calculated according to the number of remaining user terminals obtained by excluding the user terminal from the plurality of user terminals, and
   each of the remaining user terminals performs the D2D communication so that transmission power used by each of the remaining user terminals does not exceed the maximum value.

3. The mobile communication system according to claim 2, wherein
   the information indicating that the D2D communication is ended includes information indicating that the user terminal performs communication, via the base station, with the remaining user terminals, and
   the user terminal performs communication, via the base station, with the remaining user terminals.

4. The mobile communication system according to claim 1, wherein
   the base station transmits, to the user terminal, the power control information together with an instruction that the user terminal performs the discovery process, and
   the user terminal performs the discovery process so that the transmission power in the discovery process does not exceed the maximum value.

5. A network apparatus in a mobile communication system that supports D2D communication that is direct device-to-device communication in which a data path does not pass through a core network, comprising:
   a receiver configured to receive, from a user terminal, information indicating identifiers of each of a plurality of user terminals including the user terminal, wherein the plurality of user terminals perform a discovery process or the D2D communication, the discovery process being a process of discovering a proximal terminal;
   a controller configured to calculate, on the basis of the identifiers, a maximum value of transmission power used by the user terminal for performing the discovery process or the D2D communication, wherein the maximum value becomes larger as the number of a plurality of user terminals becomes larger; and
   a transmitter configured to transmit information indicating the maximum value to the user terminal.

6. A user terminal in a mobile communication system that supports D2D communication that is direct device-to-device communication in which a data path does not pass through a core network, wherein
   the user terminal is included in a plurality of user terminals that perform a discovery process or the D2D communication, the discovery process being a process of discovering a proximal terminal,
   the user terminal includes a controller configured to:
   store an equation used for calculating a maximum value of transmission power used by the user terminal for the discovery process or the D2D communication
   receive, from a base station, power control information indicating a coefficient included in the equation and terminal number information indicating the number of the plurality of user terminals,
   calculate the maximum value on the basis of the equation, the power control information and the terminal number information, wherein the maximum value becomes larger as the number of the plurality of user terminals becomes larger, and
   perform the discovery process or the D2D communication so that the transmission power does not exceed the maximum value.

7. An apparatus for controlling a network apparatus in a mobile communication system that supports D2D communication that is direct device-to-device communication in which a data path does not pass through a core network, comprising:
   at least one processor and one memory, that at least one processor configured to execute the processes of:
   receiving, from a user terminal, information indicating identifiers of each of a plurality of user terminals including the user terminal, wherein the plurality of user terminals perform a discovery process of the D2D communication, the discovery process being a process of discovering a proximal terminal;
   calculating, on the basis of the identifiers, a maximum value of transmission power used by the user terminal for performing the discovery process of the D2D communication, wherein the maximum value becomes larger as the number of a plurality of user terminals becomes larger;
   and transmitting information indicating the maximum value to the user terminal.

8. An apparatus for controlling a user terminal in a mobile communication system that supports D2D communication that is direct device-to-device communication in which a data path does not pass through a core network, wherein
- the user terminal is included in a plurality of user terminals that perform a discovery process or the D2D communication, the discovery process being a process of discovering a proximal terminal,
- the apparatus comprises at least one processor and one memory, the at least one processor configured to executes processes of
- storing an equation used for calculating a maximum value of transmission power used by the user terminal for the discovery process or the D2D communication
- receiving, from a base station, power control information indicating a coefficient included in the equation and terminal number information indicating the number of the plurality of user terminals;
- calculating the maximum value on the basis of the equation, the power control information, and the terminal number information, wherein the maximum value becomes larger as the number of the plurality of user terminals becomes larger; and
- performing the discovery process or the D2D communication so that the transmission power does not exceed the maximum value.

\* \* \* \* \*